US009182264B2

(12) United States Patent
Kaipio et al.

(10) Patent No.: US 9,182,264 B2
(45) Date of Patent: Nov. 10, 2015

(54) PROBE INDICATING INTERMATERIAL BOUNDARIES

(75) Inventors: Jari Kaipio, North Shore (NZ); Marko Vauhkonen, Kuopio (FI); Juha Reunanen, Helsinki (FI); Anssi Lehikoinen, Kuopio (FI)

(73) Assignee: Outotec Oy, Espoo (FI)

( * ) Notice: Subject to any disclaimer, the term of this patent is extended or adjusted under 35 U.S.C. 154(b) by 635 days.

(21) Appl. No.: 13/581,199

(22) PCT Filed: Feb. 25, 2011

(86) PCT No.: PCT/FI2011/050169
§ 371 (c)(1),
(2), (4) Date: Nov. 5, 2012

(87) PCT Pub. No.: WO2011/107657
PCT Pub. Date: Sep. 9, 2011

(65) Prior Publication Data
US 2013/0054191 A1    Feb. 28, 2013

(30) Foreign Application Priority Data
Mar. 1, 2010   (FI) ..................................... 20105197

(51) Int. Cl.
*G01B 13/20* (2006.01)
*G01F 23/24* (2006.01)
(Continued)

(52) U.S. Cl.
CPC .......... *G01F 23/242* (2013.01); *G01F 23/0061* (2013.01); *G01F 23/268* (2013.01)

(58) Field of Classification Search
USPC ....................................................... 702/156
See application file for complete search history.

(56) References Cited

U.S. PATENT DOCUMENTS

| 2006/0021432 | A1  | 2/2006  | Salzmann et al. |
| 2007/0227267 | A1* | 10/2007 | Loeb et al. ............... 73/862.046 |
| 2009/0153150 | A1  | 6/2009  | Slezak et al. |

FOREIGN PATENT DOCUMENTS

| CN | 101476917 A | 7/2009 |
| WO | 96/00885 A1 | 1/1996 |

(Continued)

OTHER PUBLICATIONS

Martin Baur, A Comment on the Test Methods for the Breakdown Voltage of Dielectric Liquids, Aug. 7, 2012, p. 1482-1484.*

(Continued)

*Primary Examiner* — Tung S Lau
(74) *Attorney, Agent, or Firm* — Chernoff, Vilhauer, McClung & Stenzel LLP (57) ABSTRACT

The present invention describes a method, apparatus and computer program for detecting the locations of boundaries between different materials in a desired measurement volume. The apparatus uses at least one measuring probe, the electrodes of which are characterized in that they together form an assembly that differs from a straight line. In addition, a volume at a further distance from the assembly can also be observed by the assembly, so that measurements can be conducted remotely and, on the other hand, the apparatus stays unbroken in diverse measurement situations. By using the EIT-measurement and applying for example a so-called 1D-σ-method or methods of machine learning, electrical conductivity distributions in the measured volume are detected. As a result, the locations of the possible boundaries between different materials or for example thicknesses of different material layers are detected.

21 Claims, 6 Drawing Sheets

(51) Int. Cl.
  G01F 23/00 (2006.01)
  G01F 23/26 (2006.01)

(56) References Cited

FOREIGN PATENT DOCUMENTS

| WO | 9724585 A3 | 7/1997 |
|---|---|---|
| WO | 00/62100 A2 | 10/2000 |
| WO | 2007054513 A1 | 5/2007 |
| WO | 2010/001089 A1 | 1/2010 |
| WO | 2010001089 A1 | 1/2010 |

OTHER PUBLICATIONS

Haval Y. Yacoob Aldosky, A new system for measuring electrical conductivity of water as a function of admittance, Electr Bioimp, vol. 2, pp. 86-92, 2011, Received: Aug. 27, 2011, published: Dec. 12, 2011.*

Damjan Pelc, Four-contact impedance spectroscopy of conductive liquid samples, May 2, 2011, p. 1-5.*

Gaurav J. Shah, Impedance-Based Droplet Volume and Concentration Measurement in Digital Microfluidics, p. 1308-1310, Oct. 2-6, 2011, Seattle, Washington, USA.*

J. Vergouw, C.O. Gomez, J.A. Finch, "Estimating true level in a thickener using a conductivity probe" Technical Note, Department of Mining, Metals and Materials Engineering, Wong Building, McGill University, 3610 University Street, Montreal, QC, Canada H3A 2B2, Oct. 12, 2003, 2 pages.

O-P Tossavainen, M Vauhkonen and V Kolehmainen, "A three-dimensional shape estimation approach for tracking of phase interfaces in sedimentation processes using electrical impedance tomography," Department of Physics, University of Kuopio, PO Box 1627, 70211 Kuopio, Finland, Copyright 2007 IOP Publishing Ltd, 14 pages.

H. Inaki Schlaber, Jaco H. Baas, Mi Wang, Jim L. Best, Richard A. Williams, Jeff Peakall, "Electrical Resistance Tomography for Suspended Sediment Measurements in Open Channel Flows Using a Novel Sensor Design," Jan. 24, 2006, Copyright 2006 Wiley-VCH Verlag GmbH & Co. KGaA, Weinheim, www.ppsc-journal.com, 8 pages.

Artur J. Jaworski, Guangtian Meng, "On-line measurement of separation dynamics in primary gas/oil/water separators: Challenges and technical solutions—A review," School of Mechanical, Aerospace and Civil Engineering, University of Manchester, PO Box 88, Manchester M60 1QD, UK, Journal of Petroleum Science and Engineering 68 (2009) 47-59, 13 pages.

International Search Report, PCT/FI2011/050169, completed Jun. 7, 2011; mailed Jun. 10, 2011.

Instituto Nacional De Propiedad Industrial (Chilean Patent Office), search report issued in application No. 2413-12, Jan. 17, 2015, Santiago, Chile.

Cheng et al.; "Electrode Models for Electric Current Computed Tomography" (journal article); IEEE Transactions on Biomedical Engineering; Sep. 1989: pp. 918-924; vol. 36, No. 9; IEEE Engineering in Medicine and Biology Society; Piscataway, NJ. Receipt date: Aug. 10, 2015.

Dietterich; "Ensemble Methods in Machine Learning"; in J. Kittler and F. Roli (Ed.) First International Workshop on Multiple Classifier Systems, Lecture Notes in Computer Science; 2000; pp. 1-15; Springer Verlagen; New York.

Hagan and Menhaj; "Training Feedforward Networks with the Marquardt Algorithm" (journal article); IEEE Transactions on Neural Networks; Nov. 1994; pp. 989-993; vol. 5, No. 6; Nov. 1994; IEEE Computational Intelligence Society; Piscataway, NJ.

Joliffe; "Principal Component Analysis", 2nd Edition (textbook); Springer Series in Statistics; 2002; Springer-Verlag; New York.

M. Maldonado, A. Desbiens, R. del Villar; "An update on the estimation of the froth depth using conductivity measurements" (article); Minerals Engineering 21; 2008; pp. 935-939; Elsevier Ltd.

Rosenblatt; "The Perceptron: A Probabilistic Model for Information Storage and Organization in the Brain" (journal article); Psychological Review; Nov. 1958; pp. 386-408; vol. 65, No. 6; American Psychological Association; Washington, DC.

Somersalo et al.; "Existence and Uniqueness for Electrode Models for Electric Current Computed Tomography"; SIAM Journal on Applied Mathematics; Aug. 1992; pp. 1023-1040; Society for Industrial and Applied Mathematics; Philadelphia, PA.

Vauhkonen et al.; "Tikhonov Regularization and Prior Information in Electrical Impedance Tomography" (journal article); IEEE Transactions on Medical Imaging; Apr. 1998; pp. 285-293; vol. 17. No. 2.

* cited by examiner

PROBE INDICATING INTERMATERIAL BOUNDARIES

This is a national stage application filed under 35 USC 371 based on International Application No. PCT/FI2011/050169 filed Feb. 25, 2011 and claims priority under 35USC 119 of Finnish Patent Application No. 20105197 filed Mar. 1, 2010.

FIELD OF THE INVENTION

The invention is applied in different industrial processes involving precipitation, sedimentation, flow or storage of different materials in pipeworks or containers or, more generally, processes wherein amounts of different materials must be measured in order to secure correct operation of the process.

BACKGROUND OF THE INVENTION

In many industrial processes materials in different states flow or are stored in containers, pipeworks or similar, in which case it is necessary in the process to know for example amounts, flow rates, mixture composition and similar information of different materials. Such processes typically develop boundaries between different materials, wherein the boundaries can be defined such that the densities of the materials on different sides of the boundary are different. In practice, a boundary has a specific transition area where the physical properties of the material are altered. One example of boundaries is a mixture of oil and water, where oil, being a lighter material, forms a layer on the surface of water, and a distinct boundary is found between these materials. Another example can be to examine different soil layers and sedimentation of materials in the earth, where interesting boundaries in the breaking of ore include for example boundaries between the rock material including precious metals and other rock material.

In many cases it is necessary to know the amount of material in a container or area to be examined. These situations occur in particular in the ore preparation process and sewage disposal process. A particular application in the preparation of ore is the thickening machine of the process. When the materials are distinctly separated and there is a distinct boundary between them the separation or thickening of the materials can take place.

The location of a boundary examined for example in the direction of height of the container to be examined is particularly interesting information for a number of processes. In general, these boundaries located for example in a container or in the earth are practically impossible to observe by visual inspection. On this account, more developed methods to detect boundaries are needed. There may be many different boundaries which may exist between different states of materials; however, the boundaries between two liquids or a liquid and a solid are particularly discussed below.

Boundaries between different materials precipitated by layers or the height of a fluid level have been measured in the prior art for example by acoustic and optical methods and methods based on gravity (pressure measurements) and electrical measurements. These methods have been described in [1] J. Vergouw, C. O. Gomez, J. A. Finch: "Estimating true level in a thickener using a conductivity probe", Minerals Engineering, 17:87-88, 2004; [2] O-P Tossavainen, M. Vauhkonen, V. Kolehmainen: "A three-dimensional shape estimation approach for tracking of phase interfaces in sedimentation processes using electrical impedance tomography", Measurement Science and Technology, 18:1413-1424, 2007 and [3] M. Maldonado, A. Desbiens, R. del Villar: "An update on the estimation of the froth depth using conductivity measurements", 2008. One known method of measuring boundaries by acoustic waves in based on reflection from a discontinuity point. A sound wave transmitted to a material under examination is reflected from the boundary as an electromagnetic wave would reflect from the boundary of an impedance variation. By calculating the propagation times of the reflected wave it is possible to calculate the distance of the boundary from the transmitter and further the desired height of the boundary in the y-dimension.

EIT (Electrical impedance tomography), in turn, is a method in which electrodes can be mounted on the surface of an object to be examined. The basic principle of the method is that a set of electrodes is mounted on the surface of the study object and fed with minute alternating current, whereafter the potential differences, i.e. voltages, between the electrodes are measured. Typically, the voltage measurement is made from the same electrodes as the current feed. EIST (Electrical impedance spectroscopy tomography), in turn, means that a number of different frequencies are used in the measurement, i.e. the measurements are typically made over a desired continuous frequency band. From the measured potential differences with a number of different electrode intervals it can be concluded that the electrical conductivity or permittivity of the object to be measured varies as a function of location, provided that the object in question is not completely homogenous. In practice, the conductivities are calculated by various mathematical methods in which suitable calculating models can be utilized. Such a calculation relates to the field of inversion calculation. Finally, for example a sectional view of the level of the measured object on which the electrodes have been disposed is obtained from the electrical conductivities as a function of location.

In the prior art, the height of the boundary between a solid material precipitated on the bottom of a container under examination and a liquid on top of it has been measured by introducing a measurement sensor disposed at one end of an arm directly in the precipitate. This in conjoined with fouling of the sensor, which considerably affects the measuring accuracy and performance of the sensor. In addition, the lifetime of the sensor becomes in this case, at the worst, very short.

In the prior art, sensors have been used with the electrodes disposed in a single dimension, i.e. using a straight arm with electrodes at one or both ends. For example minute electric current has been fed via such a pair of electrodes, and the potential difference, i.e. the voltage, has been measured between these electrodes. By placing the sensor arm in different locations for example in a fluid container and examining the voltage variation between the different locations it has been possible to obtain information of possible boundaries between two different materials. However, this has required numerous reproducible measurements, and fouling or even breakdown of the sensors is an essential problem.

More specifically, the boundary has been measured in the prior art as follows. Consider a container with solid precipitated material on the bottom in a layer of a specific height, and for example water on top of the precipitate. The boundary between the precipitate and water is assumed to be distinctly defined, i.e. it can be assumed that under examination in the height direction a leap in the properties of the material occurs at one point (a single coordinate value in the y-dimension). Consider an arrangement where a pair of electrodes is disposed at each end of a straight pipe. The pipe is placed vertically in the container such that the lower pair of electrodes is entirely within the precipitate and the upper one is entirely within the water. It is further assumed herein that the situation is not dynamic, i.e. the boundary between the liquid and the precipitate remains stably immovable.

According to the principle of impedance tomography, minute electric current is fed to the electrodes, and the voltage is measured on these electrodes. In other words, the voltage is measured between two adjacent electrodes. From the measurement results it is easy to calculate the characteristic resistivity of the material surrounding each pair of electrodes by formulae:

$$R_1 = \frac{U_1}{I_1} \text{ and } R_2 = \frac{U_2}{I_2} \quad (1)$$

From these values the electrical conductivities $\sigma_1$ and $\sigma_2$ of each material can be calculated. If the electrical conductivities $\sigma_1$ and $\sigma_2$ differ from each other, it can be concluded that the boundary of the materials is within the region between the two pairs of electrodes. By performing a new measurement by raising or lowering the pipe in the vertical direction a new estimate for the height is obtained after the above-mentioned calculations.

The main problem of the prior art has been fouling of the sensors and the resulting loss of operational reliability, as well as slowness in determining the boundary as a result of reproduction of the measurements. Furthermore, the sensors can typically be used in the working order for a moment, but their lifetime is not long. From the fouling it follows that the sensors or measurement electrodes must be cleaned relatively often, which means from the process point of view implementation of an automatic cleaning system for the system or, alternatively, maintenance personnel must manually clean or service the apparatus on a regular basis, which further results in pauses in the use of the apparatus.

SUMMARY OF THE INVENTION

The present invention discloses a method for detecting the locations of a material boundary or boundaries included in a volume comprising at least one material, wherein at least part of the volume is liquid material and wherein a set of probes further comprising at least one probe is used, in which method:

a set of probes comprising at least one pair of electrodes is disposed in a volume under examination;

current or voltage is fed via at least one pair of electrodes, and current or voltage is measured from at least one pair of electrodes; and a measurement geometry representing the arrangement is used in the calculation, and a calculation algorithm needed in the calculation is selected.

The characteristic features of the method include:

disposing at least three electrodes of the set of probes in the volume under examination in an assembly substantially differing from a straight line, all electrodes of the set of probes being located only in the volume of the liquid material;

calculating an electrical conductivity distribution in the volume under examination on the basis of the measurement results; and concluding, on the basis of the electrical conductivity distribution and the electrode location information, the location of at least one material boundary in the volume under examination.

In one embodiment of the present invention the feeding and measuring step is carried out using electric impedance tomography (EIT) or electric resistivity tomography (ERT).

In one embodiment of the present invention the electrodes are located on at least one probe of the set of probes such that the vectors between the electrodes span a three-dimensional subspace.

In one embodiment of the present invention the electrodes are located on at least two separate probes, the electrodes on each probe being substantially disposed on a straight line.

In one embodiment of the present invention a standard inverse problem 1D-$\sigma$-method is used in the calculation to solve the planar profiles of the boundaries.

In one embodiment of the present invention a function of the measured voltage or current values for the desired numerical values representing the boundary is determined by methods of machine learning.

In one embodiment of the present invention the results obtained from simulation are used as training material for the methods of machine learning.

In one embodiment of the present invention the employed method of machine learning is MLP-network (Multi-Layer Perceptron).

In one embodiment of the present invention the MLP-network is trained by using the Levenberg-Marquardt-algorithm.

In one embodiment of the present invention fouling of the electrodes is monitored by estimating the contact impedances between each electrode and the surrounding material.

According to a second aspect of the present invention the inventive idea also comprises a system for detecting the locations of a material boundary or boundaries included in a volume comprising at least one material, wherein at least part of the volume is liquid material and wherein a set of probes further comprising at least one probe is used, the system comprising:

a set of probes comprising at least one pair of electrodes disposed in a volume under examination;

feeding means for feeding current or voltage via at least one pair of electrodes and measuring means for measuring voltage or current from at least one pair of electrodes; and a processor using in the calculation a measurement geometry representing the arrangement and a selected calculation algorithm needed in the calculation.

As characteristic features of the system it further comprises:

at least three electrodes of the set of probes disposed in the volume under examination in an assembly substantially differing from a straight line, all electrodes of the set of probes being disposed only in the volume of the liquid material;

said processor for calculating an electrical conductivity distribution in the volume under examination on the basis of the measurement results; and said processor for concluding the location of at least one possible material boundary in the volume under examination on the basis of the electrical conductivity distribution and the electrode location information.

In one embodiment of the present invention the current feeding and measuring means are arranged to carry out the feeding and measuring steps using electric impedance tomography (EIT) or electric resistivity tomography (ERT).

In one embodiment of the present invention the electrodes are disposed on at least one probe of the set of probes such that the vectors between the electrodes span a three-dimensional subspace.

In one embodiment of the present invention the electrodes are disposed on at least two separate probes, the electrodes on each probe being substantially disposed on a straight line.

In one embodiment of the present invention said processor is arranged to use a standard inverse problem 1D-σ-method in the calculation to solve the planar profiles of the boundaries.

In one embodiment of the present invention said processor is arranged to determine a function of the measured voltage or current values for the desired numerical values representing the boundary by methods of machine learning.

In one embodiment of the present invention said processor is arranged to use the results obtained from simulation as training material for the methods of machine learning.

In one embodiment of the present invention the employed method of machine learning is MLP-network (Multi-Layer Perceptron).

In one embodiment of the present invention the MLP-network is trained by using the Levenberg-Marquardt-algorithm.

In one embodiment of the present invention said measuring means are arranged to estimate the contact impedances between each electrode and the surrounding material to monitor the fouling of the electrodes.

According to a third aspect of the present invention the inventive idea additionally comprises a computer program further comprising program code which, when run on a data processing device, is arranged to control the steps of the method described above which are executable on a processor or other computing device.

The advantage of the invention is that the electrode assembly of the measuring system need not be disposed in the region of the precipitate in a measurement volume comprising precipitate that includes solid material and a liquid. In addition, the boundary (or boundaries) can be detected by using only one measuring arrangement without the need to move the electrodes from one place to another.

DETAILED DESCRIPTION OF THE INVENTION

The present invention discloses a new type of a measuring probe based on conductivity sensor measurements for observing the boundaries between two materials. The method also utilizes modern data processing methods and calculation methods. The method utilizes EIT-measurements typically performed within the volume to be measured. Since it is computationally very complicated to create complete conductivity distribution of a volume under examination, the invention utilizes methods of machine learning. In particular, the invention allows the use of an electrode assembly which need not be disposed within the solid material in a container with solid precipitate on the bottom. In other words, the probe can be used to detect conductivity distributions also in other regions than the area between the measuring electrodes.

The basic idea of the invention comprises use of a measurement based on electric impedance tomography, wherein different conductivities between different sides of a boundary of two materials or, more generally, as the composition of the material under examination varies as a function of three-dimensional location can be utilized. It is the consequence of these different properties of the materials that boundaries may exist in the first place. In locations of the material volume where the properties of the material vary more intensively than normally a more intensive variation than normally can also be found in the electrical properties such as electrical conductivity as a function of location. In order for boundaries to be able to emerge and be observable as well, segregation, precipitation or other non-homogenization must have taken place in a mixture of several different materials. In this case, for example substances having different masses can be separated from each other such that more intensive variation than on the average in electrical conductivity, characteristic impedance or other measurable property can be observed in the boundary area of the materials.

The so-called contact impedances between each electrode and the material can also be taken into account in the calculation, typically meaning additional electrical resistance due to dirt surrounding the electrode or unidealistic conditions of the contact (between the electrode and the surroundings). This further results in additional voltage drop. In this case, it can be stated that the voltage measured by a pair of electrodes is a function of the electric current fed, the conductivity distribution of the path of the electric current, and the contact impedance between the electrodes and the surrounding material. In this situation it is possible to continue the measurements as normally, even if the electrodes were a bit fouled (typically, a layer of gypsum develops on the surface during use). On the other hand, if the amount of dirt exceeds a specific limit, this can be observed and for example a warning signal can be given in the situation. By calculating the contact impedance, the need for maintenance of the sensor assembly is also decreased, which further reduces the costs incurring from everyday use.

The distance between electrodes can be selected freely to be suitable for each application. This is also influenced by the dimensions on the material volume to be measured. The number of the employed electrodes (disposed on one or more probes, in total) is typically at least three.

As the currents and voltages are known after the EIT measurement, the task is to determine the internal electrical conductivity distribution of the material volume under examination. This type of a problem is a so-called inversion problem, which is characterized by being ill-posed, i.e. a solution to the problem is not unambiguous or does not exist. The opposite of an inversion problem is a so-called forward problem, which in this embodiment would be detection of the electrode voltages on the basis of the known feed currents and the electrical conductivity distribution. In this connection a so-called complete electrode model can be used which is described for example in Cheng et al.: "Electrode models for electric current computed tomography", IEEE Transactions on Biomedical Engineering, 36:918-924, 1989; and Somersalo et al.: "Existence and uniqueness for electrode models for electric current computed tomography", SIAM Journal on Applied Mathematics, 52:1023-1040, 1992. In a forward problem, in turn, the so-called Finite Element Method (FEM) is used, which is described for example in Vauhkonen et al.: "Tikhonov regularization and prior information in electrical impedance tomography", IEEE Transactions on Biomedical Engineering, 45:486-493, 1998.

The inverse problem comprises examining a regularized minimization problem of the form:

$$\sigma, z = \arg\min \{\|U_{meas} - U(\sigma,z)\|^2 + \alpha_1\|L_1(\sigma-\sigma_*)\|^2 + \alpha_2\|L_2(z-z_*)\|^2\} \quad (2)$$

where $\sigma$ is unknown conductivity distribution, z includes effective contact impedances between the electrodes and the surrounding material, $U_{meas}$ denotes the voltages measured from the electrodes, $U(\sigma,z)$ is the voltage calculated for example by the FEM-method associated to a forward problem, $L_{1,2}$ are regularization matrices, $\alpha_{1,2}$ are regularization parameters and $\sigma_*$ and $z_*$ are the previous values for conductivity and contact impedance, respectively.

Estimates for conductivity distribution and contact impedances can be iteratively calculated for example by the Gauss-Newton method. In this connection, Tikhonov regularization is additionally used, which is described in the above-mentioned publication Vauhkonen.

In the method of the invention, planar profiles of the boundaries can be estimated for example by a so-called 1D-$\sigma$-method. To be able to utilize EIT to estimate the boundary, the measurement geometry must first be determined for calculation. This encompasses determination of the geometry of the probe and geometry of the electrodes disposed on the surface thereof so as to be able to create a calculation grid for the element method. Often, the object (for example a thickener) including the boundary is so large that the calculation area to be discreted can be limited to the vicinity of the probe, sufficiently far from the electrodes. When this positioning of the measurement geometry is complete, the geometry can be discreted as having finite dimensions. This can be done by readymade programs, for example Netgen. An example of such discretion, i.e. a computing grid, for a T-probe is presented in FIG. 1.

The method based on impedance tomography to solve the boundaries from the current-voltage data is referred to as 1D-$\sigma$ in this connection and complies with the same basic principles as the above-mentioned known Tikhonov-regularized solution. Estimates of the conductivity distribution and contact impedances can be calculated iteratively using the Gauss-Newton method. In iteration round "i+1" the quantity $\theta_{i+1} = [\sigma_{i+1}, z_{i+1}]$ can be expressed by the relation:

$$\theta_{i+1} = \theta_i + \kappa_i \delta\theta_i \quad (3)$$

where $\kappa_i$ is the step length. In addition, search direction $\delta\theta_i$ is defined by the formula:

$$\delta\theta_i = [J_i^T J_i + L_\theta]^{-1} [J_i^T(U_{meas} - U(\theta_i)) + L_\theta^{-1}(\theta_i - \theta_*)] \quad (4)$$

where $J_i = [J_{\sigma,i}, J_{z,i}]$ is Jacobian matrix calculated for conductivity and contact impedances, $L_\theta$ is the regularization matrix and $\theta_* = (\sigma_*, z_*)$ is the first guess for conductivity and contact impedances. The regularization matrix for quantity $\theta_i = [\sigma, z]$ can be built in the following form $$L_\theta = \begin{bmatrix} \alpha_1 L_1^T L_1 & 0 \\ 0 & \alpha_2 L_2^T L_2 \end{bmatrix}, \quad (5)$$

where $L_1$ and $L_2$ are regularization matrices of conductivity distribution and contact impedances, and $\alpha_1$ and $\alpha_2$ represent the respective regularization parameters.

When the conductivity distribution is assumed to vary only in the direction of depth of the object, the problem is reduced to a one-dimensional inversion problem where variations in conductivity only in a single dimension are solved. The 1D-$\sigma$-method can briefly be described in the following way:

1. The solution to the inversion problem is calculated in a 1-dimensional discreted grid where one point corresponds to discrete conductivity at a specific depth.

The obtained solution is interpolated to a real 3D-calculation grid to calculate the voltage values (quantity $U(\theta_i)$ in equation (4)).

2. Columns of the Jacobian matrix calculated for conductivity in the 3D-calculation grid and corresponding to the above-mentioned heights are summed. Then, a new Jacobian matrix is formed, wherein the number of columns corresponds to the heights of the discreted calculation area. The terms of the Jacobian matrix for the contact impedance are added to the final Jacobian matrix.

3. As prior knowledge it is assumed that the conductivity distribution and effective contact impedances are smooth, i.e. the values of physically adjacent points and adjacent electrodes are not largely variable. Thus, the regularization matrices for conductivity and contact impedances are differential matrices. Also another approach can be utilized in the regularization.

The above is a method for determining the absolute values of 1D-conductivity distribution. As is known, the same can be performed for variation of electrical conductivity of the object (differential function).

In the following, determination of the parameters of a boundary profile from conductivity distribution obtained with 1D-$\sigma$ is discussed.

As a result of the 1D-$\sigma$-method, one-dimensional conductivity distribution, $\sigma(s)$, as a function of depth s is obtained. The objects of interest in this distribution normally include conductivities at the bottom and the top, width of the conductivity variation region, i.e. the transition area, and depth of the boundary. Conductivity of the upper surface is expressed as $\sigma_0$, conductivity of the lower surface as $\sigma_1$, depth of the boundary as D and width of the transition area as T. In the following, one way of generating the parameters D, T, $\sigma_0$ and $\sigma_1$ from a solution obtained as an inverse problem $\sigma(s)$ is shown.

To calculate the depth of the boundary D the adjacent values of $\sigma(s)$ are divided by respective distances of s. This gives approximation for the derivative of $\sigma(s)$ $$\frac{d\sigma(s)}{ds_k} \approx \frac{\sigma(s_{k+1}) - \sigma(s_k)}{s_{k+1} - s_k}, \quad (6)$$

where $k \in I_N = \{1, 2, 3, \ldots, N-1\}$ is the index of a single point on a discreted depthwise coordinate axis. This allows to estimate D as a maximum of the absolute values of these values $$D \approx \arg\max_{s_k} \left\{ \left| \frac{d\sigma(s)}{ds_k} \right| \right\}, k \in I_N \quad (7)$$

To calculate the conductivities at the top and the bottom, $\sigma_0$ and $\sigma_1$, a minimum $\sigma_{min}$ and a maximum $\sigma_{max}$ of the conductivity distribution $\sigma(s)$ are determined. If $\epsilon$ is a predetermined tolerance value and $I = I_N \cup \{N\}$, then the subsets of the indices of the minimum and maximum are $$I_{min} = \{k \in I | \sigma(z_k) \leq \sigma_{min} + \epsilon\} \text{ and} \quad (8)$$

$$I_{max} = \{k \in I | \sigma(z_k) \geq \sigma_{max} - \epsilon\} \quad (9)$$

Using these subsets and assuming $\sigma_1 \leq \sigma_0$, estimates for conductivities of the upper and the lower surface can be calculated by averaging the values of sets $$\sigma_0 \approx \frac{1}{N_{max}} \sum_{i \in I_{max}} \sigma(s_i) \text{ and} \quad (10)$$

$$\sigma_1 \approx \frac{1}{N_{min}} \sum_{i \in I_{min}} \sigma(s_i), \quad (11)$$

where $N_{max}$ and $N_{min}$ are cardinalities of sets $I_{max}$ and $I_{min}$. When $\sigma_1 \geq \sigma_0$, the calculation is performed inversely.

Width of the transition area T can be estimated using the above-given subsets $I_{min}$ and $I_{max}$. When $\sigma_1 \leq \sigma_0$ and $T_0$ and $T_1$ are determined by equations $$T_0 = \max_{i \in I_{max}} \{s_i\} \text{ and} \quad (12)$$

$$T_1 = \min_{i \in I_{min}} \{s_i\} \quad (13)$$

the result is that $T \approx T_1 - T_0$. When $\sigma_1 \geq \sigma_0$, the calculation is performed inversely.

The following discloses simulations of 1D-σ estimates and calculated boundary parameters.

Figure 1:
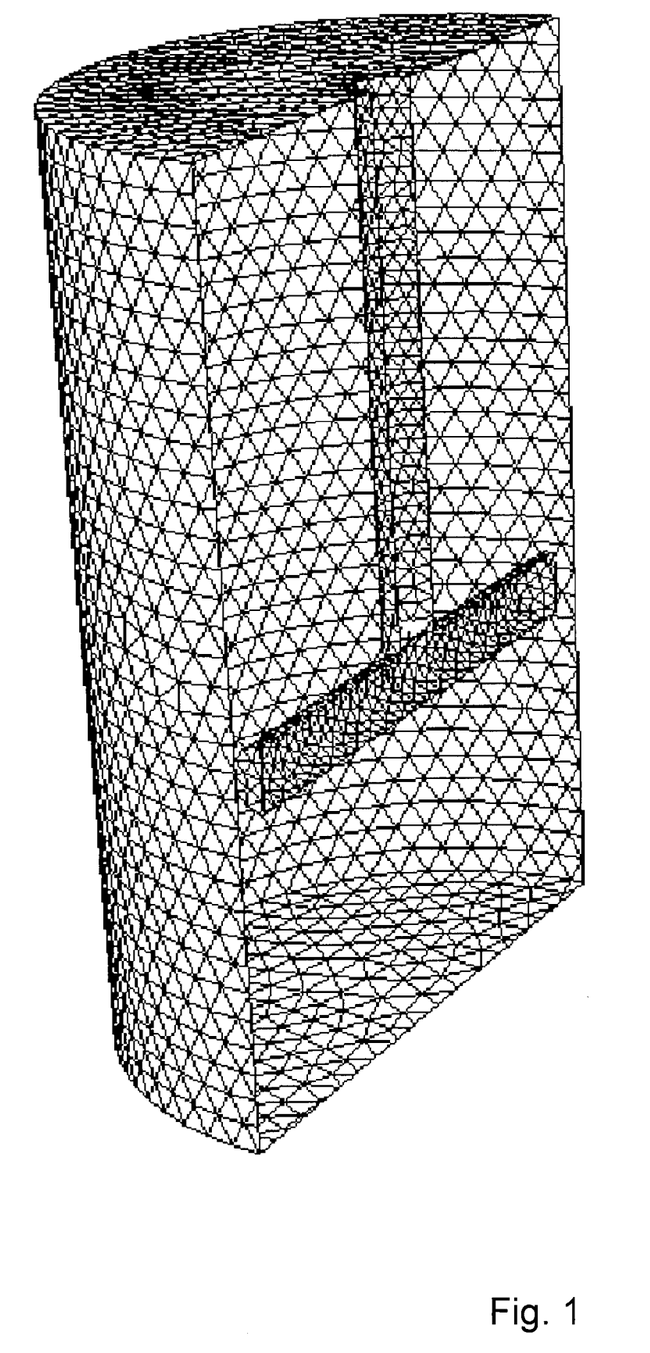
FIG. 1 presents an example of discretion, i.e. a calculation grid, for a T-probe using the Netgen software.

The simulations were performed in a geometry similar to FIG. 1. The boundary including conductivity variation is located in a cylindrical object having a diameter of 400 mm and a height of 600 mm. A T-type EIT measurement sensor provided with 18 band-type electrodes, 10 of them disposed on the vertical section and the remaining 8 on the horizontal section, is introduced in the object from above. From the geometry determined above, a simulation grid $M_1$ was created for the simulations, which was divided in 31845 discrete points. For 1D-σ, a calculation grid $M_2$ was prepared, consisting of 14562 discrete points. For 1D-σ, also a depthwise 1D-grid $M_3$ was created wherein 31 points were created at a distance of 20 mm from each other.

For simulations, different boundary profiles were prepared on grid $M_1$ by the formula $$\sigma = \sigma_0 \cdot \frac{1 + \sigma_1 \exp[a(s-D)/T]}{1 + \sigma_0 \exp[a(s-D)/T]}, \quad (14)$$

where $\sigma = \sigma(s)$ is conductivity at depth s, $\sigma_0$ and $\sigma_1$ are conductivities of the upper and the lower side, D is depth of the boundary, T is width of the transition area, s is depth and a is a parameter representing the shape of the curve. The employed values of parameters $\sigma_0$, $\sigma_1$, D and T are presented in the table below. The value of parameter a was 7. In addition, 30 different current feeds were created between the electrodes. Corresponding to the boundary profiles and current feeds in question, voltages $U_{sim}$ were calculated by the forward problem, expressing the potential differences of adjacent electrodes at each current feed. To the simulated voltages was added 1% of Gaussian noise as determined from each simulated value. Similar values of contact impedances used in the simulated voltages were set for "packs" of 4-5 electrodes, and the value of each pack was drawn from a uniformly distributed random interval [0.3 Ωmm², 1.8 Ωmm²].

Figure 2:
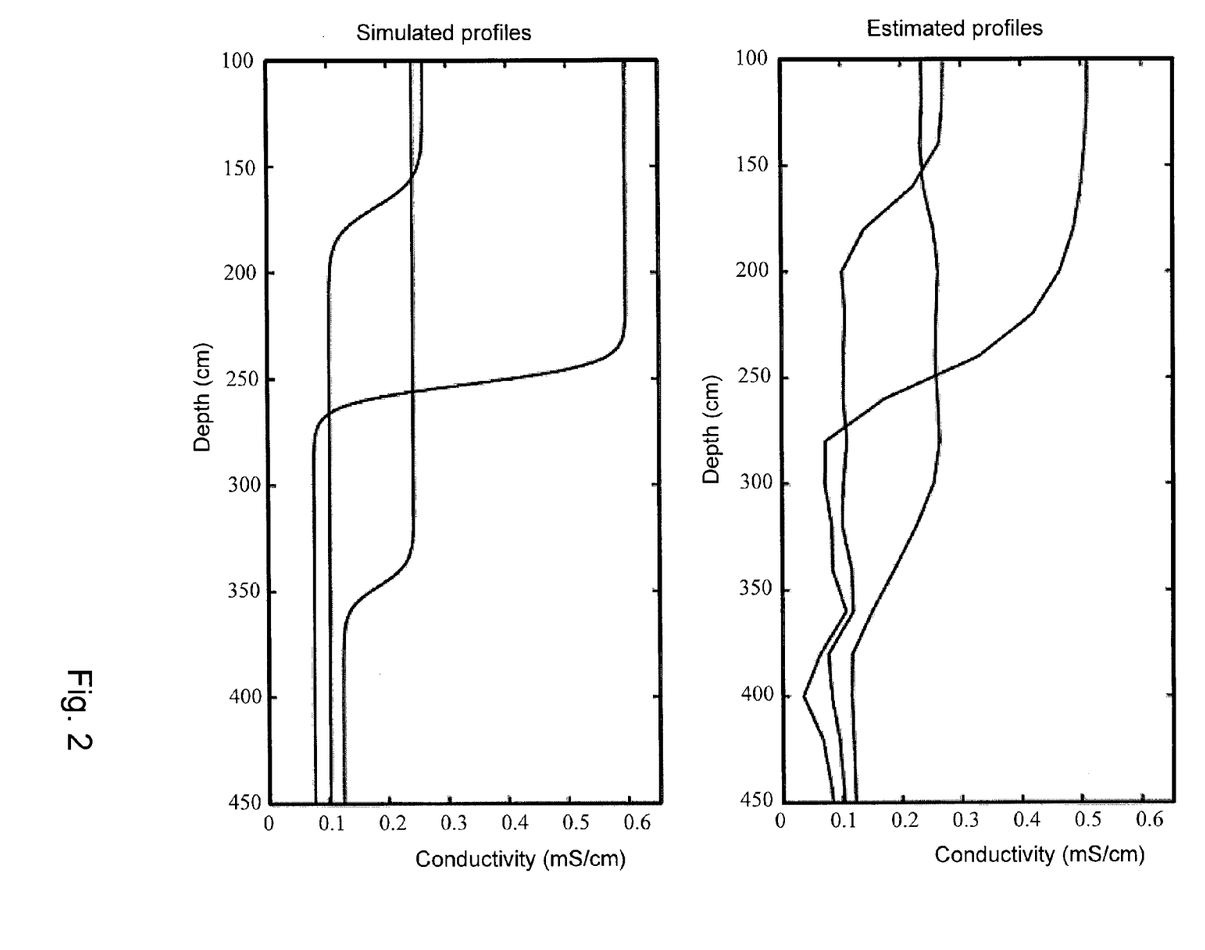
FIG. 2 presents three simulated conductivity profiles and the conductivity profiles estimated therefrom by the 1D-σ-method.

Corresponding to voltages $U_{sim}$, boundary profiles were estimated by the above 1D-σ-method as a solution to the inverse problem. The calculation was performed in grids $M_2$ and $M_3$. The parameters of the inverse problem were set as follows: the mean value of the boundary profile simulated for all grid points was set as the prior value of conductivity $\sigma_*$, the mean value of simulated contact impedance values was set as the prior value of contact impedance $z_*$, respectively, value 5 was set as a regularization parameter $\alpha_1$ and value 0.5 was set as $\alpha_2$. The boundary parameters were calculated from the estimated boundary profile on the basis of that given above. FIG. 2 shows visualizations of the correct and estimated boundary profiles. The following table presents the correct and estimated boundary parameters, i.e. the values of boundary parameters D, T, $\sigma_1$ and $\sigma_0$ of the simulated conductivity profile and estimates $\tilde{D}$, $\tilde{T}$, $\tilde{\sigma}_1$ and $\tilde{\sigma}_0$ calculated from the conductivity profile estimated by 1D-σ.

| D | $\tilde{D}$ | T | $\tilde{T}$ | $\sigma_1$ | $\tilde{\sigma}_1$ | $\sigma_0$ | $\tilde{\sigma}_0$ |
|---|---|---|---|---|---|---|---|
| 100 | 110.0 | 32.9108 | 20.0 | 0.1294 | 0.1264 | 0.2916 | 0.1823 |
| 130 | 130.0 | 32.7214 | 40.0 | 0.0811 | 0.0876 | 0.5653 | 0.3503 |
| 160 | 170.0 | 47.3858 | 20.0 | 0.1029 | 0.1050 | 0.2610 | 0.2639 |
| 190 | 190.0 | 41.5941 | 20.0 | 0.0666 | 0.0759 | 0.5303 | 0.4233 |
| 220 | 230.0 | 40.9972 | 40.0 | 0.1102 | 0.1134 | 0.4153 | 0.3691 |
| 250 | 250.0 | 32.8991 | 20.0 | 0.0763 | 0.0866 | 0.5985 | 0.4957 |
| 280 | 290.0 | 47.0606 | 40.0 | 0.1154 | 0.1065 | 0.2313 | 0.2272 |
| 310 | 310.0 | 42.4411 | 40.0 | 0.1189 | 0.0850 | 0.3771 | 0.3337 |
| 340 | 350.0 | 37.0190 | 40.0 | 0.1248 | 0.1247 | 0.2427 | 0.2441 |
| 370 | 330.0 | 40.2650 | 40.0 | 0.0951 | 0.2963 | 0.5848 | 0.5318 |
| 400 | 390.0 | 38.0362 | 40.0 | 0.0584 | 0.0809 | 0.2019 | 0.2004 |

Alternatively, instead of the 1D-σ-method, in one embodiment of the invention a function of the measured voltage or current values can be determined for desired numerical values representing the boundary by methods of machine learning.

Since the calculations involved in the 1D-σ-method are demanding in the general case, its use may require a relatively large and efficient calculating unit. As one exemplifying embodiment of the invention, methods of machine learning can be used to approximate the results of the 1D-σ-method at an accuracy which is sufficient in practical terms. In this case, a simple calculating unit (e.g. digital signal processor with only limited memory available) is sufficient for online implementation of the embodiment.

For methods of machine learning, specific training material is required, which in the case of the invention is obtained from the above simulation results. The inputs, i.e. independent variables, in the learning model include simulated voltages $U_{sim}$, whereas the quantities $\sigma_0$, $\sigma_1$, D and T to be estimated are set as outputs, i.e. dependent variables, of the model.

The methods of machine learning aim at finding rules for determining a function of any inputs for a space (four-dimensional in this case) corresponding to the outputs such that the inputs of the training material are a sufficiently accurate function of the corresponding desired outputs of the training material. Once this function has been determined, it can be used to estimate outputs also for new recently measured inputs.

Figure 3:
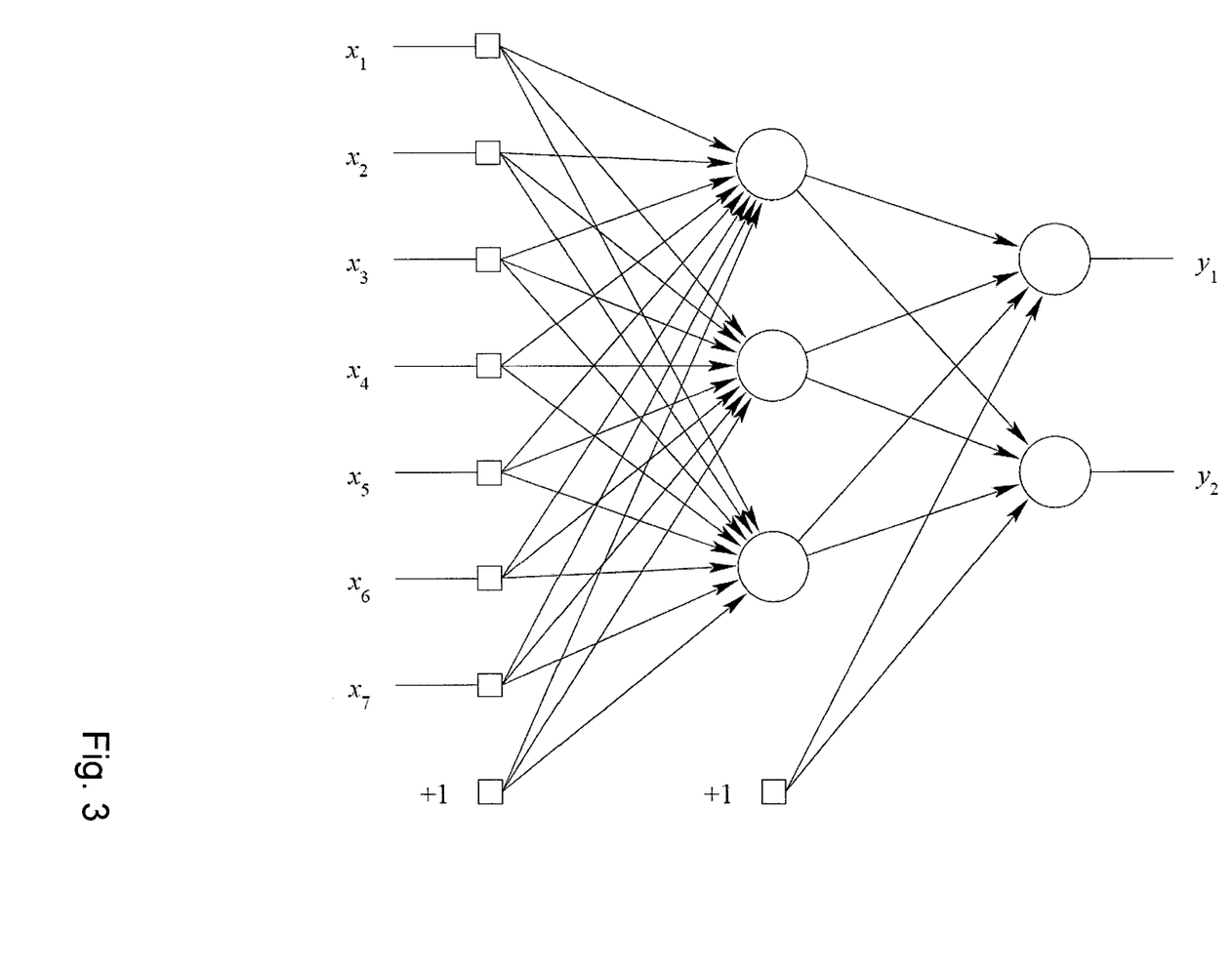
FIG. 3 presents an example of a so-called MLP-network (Multi-Layer Perceptron)

In one embodiment of the invention a so-called Multi-layer Perceptron, MLP-network, is selected as the method of machine learning. This is limited to a two-layer network determining a function of the inputs $x_i$ for outputs $y_i$ according to FIG. 3. In the figure, the nodes indicated by a circle represent so-called Rosenblatt perceptrons (Rosenblatt: "The perceptron: A probabilistic model for information storage and organization in the brain", Psychological Review, 65(6): 386-408, 1958), each calculating a specifically weighed sum from inputs corresponding to the incoming arrows and finally possibly attenuating the response by using a so-called specific sigmoid function. In this connection attenuation is used only in the first layer depicted on the left in the figure. Thus, the rules executed by MLP can be expressed as a function $$\overline{y}=f(\overline{x})=\overline{W}_2 \cdot g(\overline{W}_1 \overline{x}+\overline{b}_1)+\overline{b}_2 \qquad (15)$$

where $\overline{y}=[y_1 \ldots y_n]$ is output of the model for input $x=[x_1 \ldots x_m]$ at specific network parameters, i.e. weighing matrices $\overline{W}_1$ and $\overline{W}_2$ and so-called bias vectors $\overline{b}_1$ and $\overline{b}_2$. The function $g(\overline{z})$ is not a general multiple variable function but is applied to vector $\overline{z}=[z_1 \ldots z_k]_T$ by elements, i.e.

$$g(\overline{z}) = \begin{bmatrix} g*(z_1) \\ \vdots \\ g*(z_k) \end{bmatrix} = \begin{bmatrix} \tanh(z_1) \\ \vdots \\ \tanh(z_k) \end{bmatrix}, \qquad (16)$$

where a hyperbolic tangent function $\tan h(z_i)=(\exp(2z_i)-1)/(\exp(2z_i)+1)$ is used for attenuation.

Determination of the weighing matrices $\overline{W}_1$ and $\overline{W}_2$ and the bias vectors $\overline{b}_1$ and $\overline{b}_2$ on the basis of the training material is referred to as training the MLP network. Normally, the training method aims at changing the values of these parameters such that the inputs of the training material would be as accurate a function as possible of the corresponding desired responses of the training material. In one embodiment of the invention this training step is performed by using the so-called Levenberg-Marquardt algorithm (Hagan and Menhaj: "Training feedforward networks with the Marquardt algorithm", IEEE Transactions on Neural Networks, 5(6): 989-993, 1994).

In one embodiment of the invention the training can be facilitated by calculating from inputs $U_{sim}$ a specific number of so-called principal components (e.g. Jolliffe: "Principal Component Analysis", Springer, 2. edition, 2002), which is smaller than the number of the original voltage measurements, and using thus obtained values as inputs in the network to be trained. By storing the conversion from the voltage measurements on principal components, the same function can also be determined for new online-measured voltage vectors before their input to the MLP network.

In one embodiment of the invention a committee formed by several networks is used instead of a single MLP-network. This is known to reduce the variance resulting from uncertainty of the training and thereby improve the generalization ability of the final estimator (e.g. Dietterich, "Ensemble methods in machine learning", in Kittler and Roli (eds.): "Multiple Classifier Systems", LNCS 1857, 1-15, Springer, 2000).

Training the MLP-network is computationally heavy but can be performed offline before or in connection with introduction of the measuring instrument, either based on simulations or real measurements. In this case, only a very simple program that executes function (15), weighing matrices $\overline{W}_1$ and $\overline{W}_2$, and bias vectors $\overline{b}_1$ and $\overline{b}_2$ would have to be loaded on the actual measuring instrument. In using the principal component conversion, also a program that executes the conversion and a conversion matrix are needed. In the case of a committee, additionally a program that executes the committee and the weighing matrices and bias vectors are needed as many times as there are members in the committee. As a calculation, the production of estimates on the basis of new voltage measurements is simple. In particular, the hyperbolic tangent function can be represented as a so-called lookup table, in which case the apparatus is practically not required to support other calculations except additions and multiplications as well as roundings and table designations.

The outputs of the model obtained by methods of machine learning may also include, in addition to parameters $\sigma_0$, $\sigma_1$, D and T, the contact impedances. In this case, the model can also be used, in addition to estimating the boundary, to monitor the fouling of the electrodes.

Next, the preferred embodiments of positioning the electrode assembly in the apparatus described in the invention are discussed. If, instead of straight positioning of the electrodes as proposed by the prior art, at least three electrodes are used such that the positioning of the electrode assembly differs from a straight line, the above-mentioned prior art problems are avoided. If the electrodes are positioned for example at each end and/or angle of a T-, Z-, F-, L- or Y-type assembly, it is possible to place the assembly for example entirely in water or other liquid without immersion in solid or precipitated material and yet be able to detect the height or location of the possible or at least one material boundary located below the assembly as measured from a desired reference. There are naturally other alternatives of positioning the electrodes; they can be for example disposed in a zigzag array or in a manner differing in another way from a straight line. The electrodes can also be positioned on several separate probes such that each probe comprises at least one electrode. In this case, however, the electrodes of an assembly formed by one or more probes differ from a straight line, and, at the best, moving the probes in detecting the boundaries is avoided. The essential idea of the method and apparatus can thus be distilled in that the set formed by the electrodes is located in at least two different dimensions, i.e. essentially differing from a straight line in a single dimension. In addition, in using a number of straight probes, the core difference in respect to the prior art is that the pairs of electrodes used for signal feeds and measurements are formed between different desired probes.

One alternative in the invention is to dispose two separate rod-shaped sensor assemblies adjacently in the vertical direction at a suitable mutual distance from each other. Both sensor assemblies with electrodes can be located entirely in water or other liquid without contacting the precipitate including solid material. In one embodiment the distance of two electrodes in a single rod-shaped assembly is approximately on the same order as the mutual horizontal distance between the two rod-shaped assemblies. In another example several electrodes can be located sequentially on a single probe in a desired number. The voltages measured by two assemblies (probes) also exhibit the effect of the composition of the materials below the assembly, which is not perceived by a single rod-shaped assembly of two or more electrodes. In the measurement, test current flows in this case also outside the area between the probes defined by straight lines, i.e. via the precipitate region in the above example. This way, it is possible to observe that the electric field extends to both sides of the boundary between the liquid and the solid material, and the voltage measurement performed by the probe(s) by means of the above described modeling and inversion calculation brings out the possible existence and locations of the boundaries.

The idea of the present invention can for example be extended by examining a volume including several sedimented materials, and several different boundaries between the different materials can be located by the method. Also in this case the probes can be located, in the case of the above-mentioned container, only in the liquid region, but in practice the thickness of each material layer encompasses a specific upper limit in case the lowest boundary is to be detected by this method as well.

In one embodiment of the invention the probe or probes can be moved in the area of the volume to be measured, and the EIT-measurement and calculation process can be repeated after relocation. This way, more accurate three-dimensional information on the location of the boundary is obtained in a situation where thicknesses of the sedimented layers vary or where the boundaries may exist in unlimited directions (other than horizontal). Finally, the apparatus allows the generation of an accurate 3-D-map or diagram where different materials and boundaries are visible for example in different colors on the screen of the user's computer.

Figure 4:
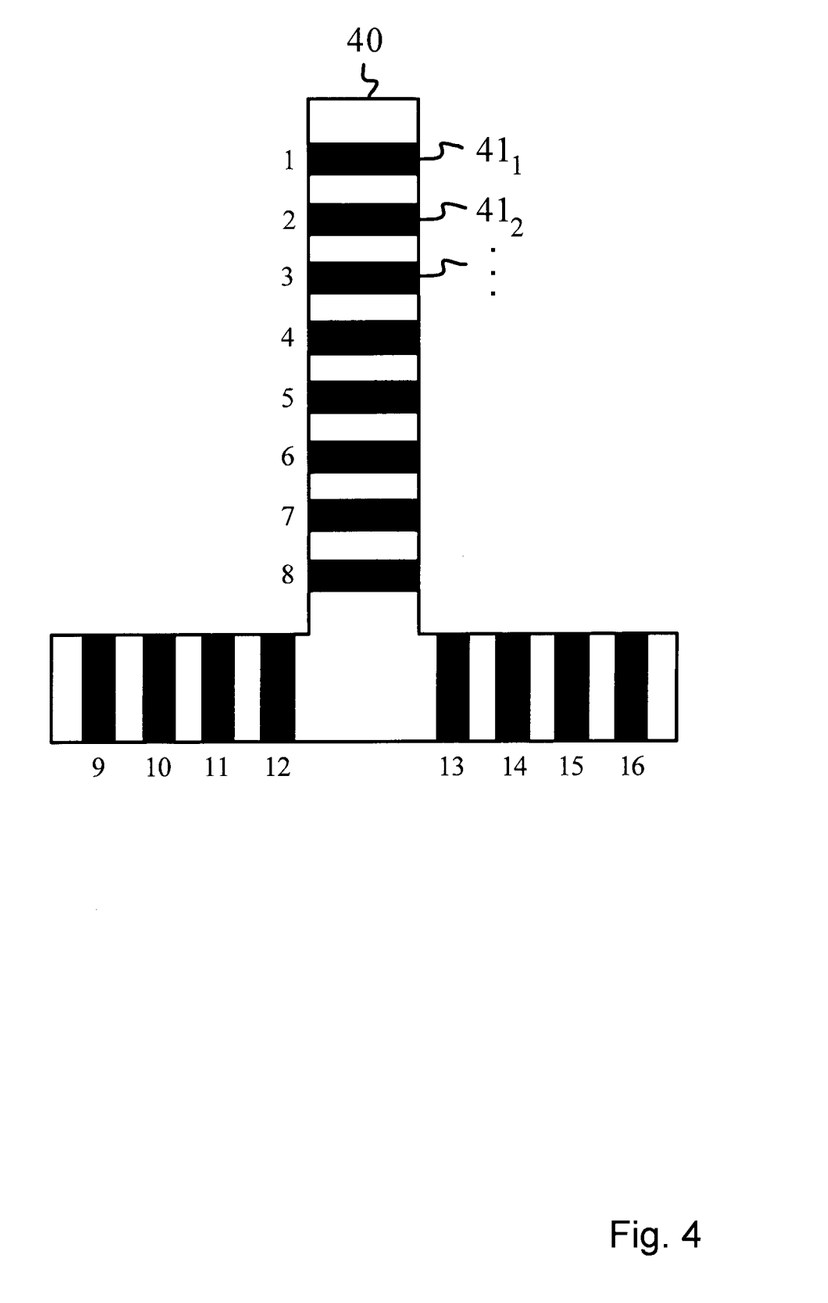
FIG. 4 presents an example of a probe used in the invention, wherein the electrodes are disposed in a T-assembly.

FIG. 4 shows one typical example of a probe used in the invention. The probe 40 of the example is T-shaped, which preferably allows the formation of an assembly that differs from a straight line, yet is quite simple. Electrodes are mounted sequentially on the vertical section (one arm) of the assembly. In this example their number is eight, but another number of the electrodes can be used as well. In this example the electrodes are disposed at regular intervals, but they can also be disposed at variable mutual distances. Four electrodes are disposed on the two other tips, on each branch, of the T-probe of the example. In other words, there are 16 numbered electrodes in the example indicated $41_1, \ldots, n$.

Figure 5A:
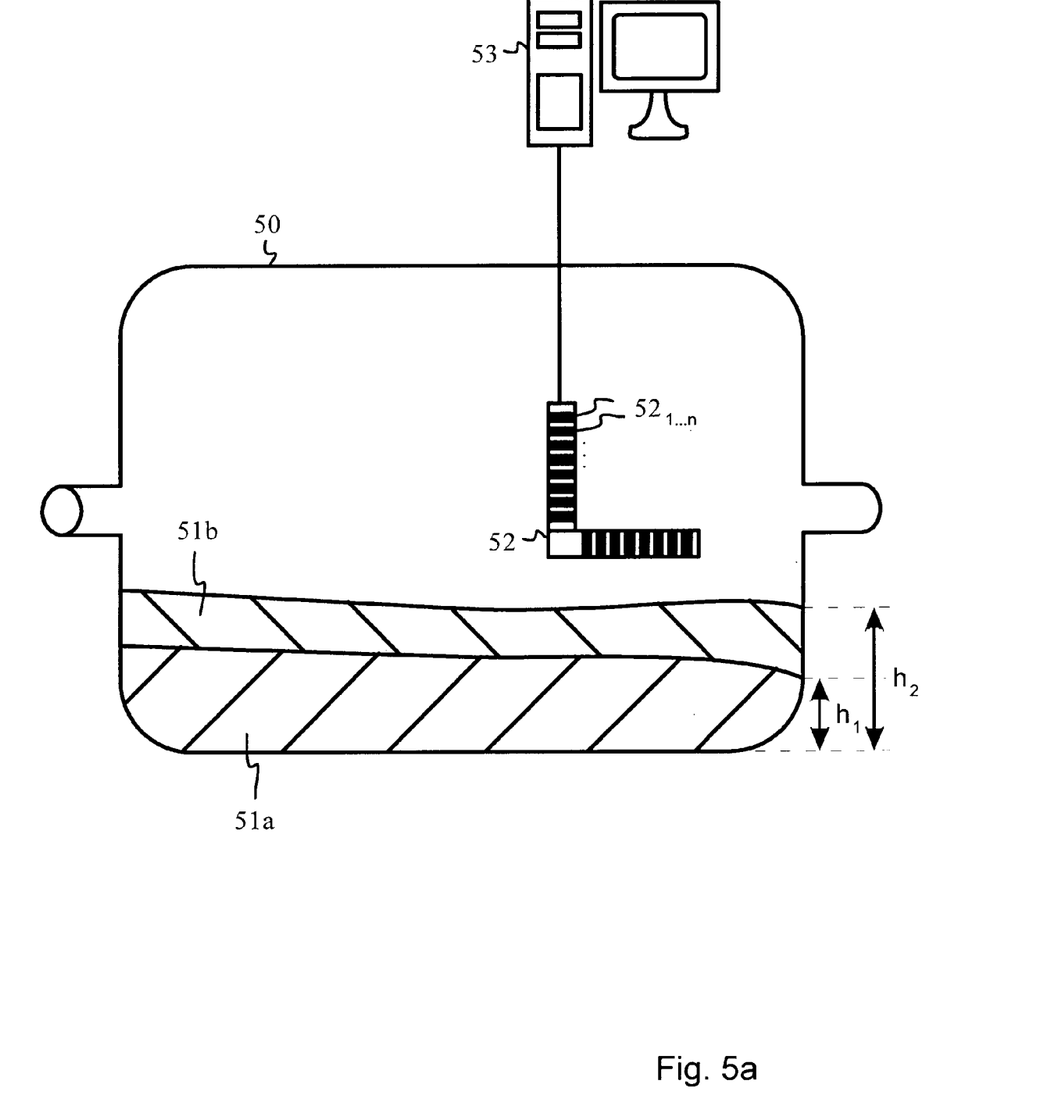
FIG. 5a presents an example of a container which is an application of the invention, wherein material layers have been sedimented and wherein the boundaries are measured by an L-probe.

FIG. 5a in turn discloses a measurement arrangement with an example of a container 50 wherein and wherefrom a material mixture with solid material precipitated in a liquid is led. The container may represent any flow application where flowing material is guided or runs from one container to another or migrates for example through pipes. On the bottom of the container 50 in the example there has been accumulated sedimented material formed on the basis of different masses or other properties of the components in the mixture. The first material 51a, being heaviest, has been precipitated at the bottom, and the thickness of the material layer is indicated by $h_1$, which may naturally vary at different sites of the bottom of the container. As a lighter material, a second material layer 51b has been sedimented on top of the first material layer, the height of the upper level of which from the bottom of the container is indicated by $h_2$ (which may also vary as a function of the bottom coordinates of the container).

A measurement probe 52, which in this example is L-shaped, can now be introduced inside the container 50. Another shape that differs from a straight line is also possible for the electrode assembly. As an example, this probe has 8+8 electrodes $52_1$-$52_n$ mounted on the two orthogonal branches of the probe body. In the example the L-probe can be disposed entirely above the sedimented layers such that fouling of the electrodes can be prevented. The electrode assembly can also be moved inside the container such that the location of the probe can be freely selected, where necessary, in the sediment-free area of the container.

Control of the apparatus (the parts performing the current feed and the measurement) and the required calculation logic can be carried out for example by a separate or integrated controller or computer depicted in the example of the figure as a server 53. The above-described measurement functions are controlled to be executed by a computer program installed on the computer, and the processor of the computer can process the required calculation operations. On the other hand it is also possible to locate the current feed and measurement parts needed by the EIT- or ERT-measurement in a separate unit not necessarily requiring a separate monitor (as depicted in the figure). In this case the obtained measurement data can be transferred to be processed by a separate processor which may exist in a computer being a separate unit.

In one embodiment of the invention it is possible to use a single integrated controller that controls the feeds, measurements and performs calculations, but a monitor is not necessarily needed. The controller may control for example a horn, giving an alarm where necessary, forward the measurement data as a desired signal for use by another system, or directly adjust a mechanism of the process under examination or an effective signal in the process.

In another application the feeding parts, measuring parts and processing parts can all be implemented as separate and independently controlled units. One alternative is to integrate two functionalities of the above-mentioned and implement the third functionality as a separate unit. If necessary, monitoring means can be coupled to a desired part and implemented for example as a monitor connected to a computer (as presented in FIG. 5a) and/or an integrated signal display of the feeding/measuring instrument.

The necessary connections between the current feeding parts, measuring parts, calculating unit (processor) 53 and further the set of probes 52 can be provided using known wired or wireless connection means such as different cablings, or by remote use for example over an internet connection. As a result of calculation, the values $h_1$ and $h_2$ can be produced as a function of location, or for example a more accurate schematic plan for variations in the material properties and/or boundaries can be produced as a two-dimensional cross-sectional view.

If, on the other hand, at least four electrodes are used so as to locate them in substantially three dimensions, i.e. the vectors between them spanning the basis of a three-dimensional space, it is possible, without moving the assembly, to produce a truly three-dimensional representation of the measurable electrical properties in the surroundings of the set of electrodes and the possible boundaries. The probe of FIG. 5a could be adapted accordingly for example by adding a third branch to the angle of the letter L perpendicularly to both existing branches.

Figure 5B:
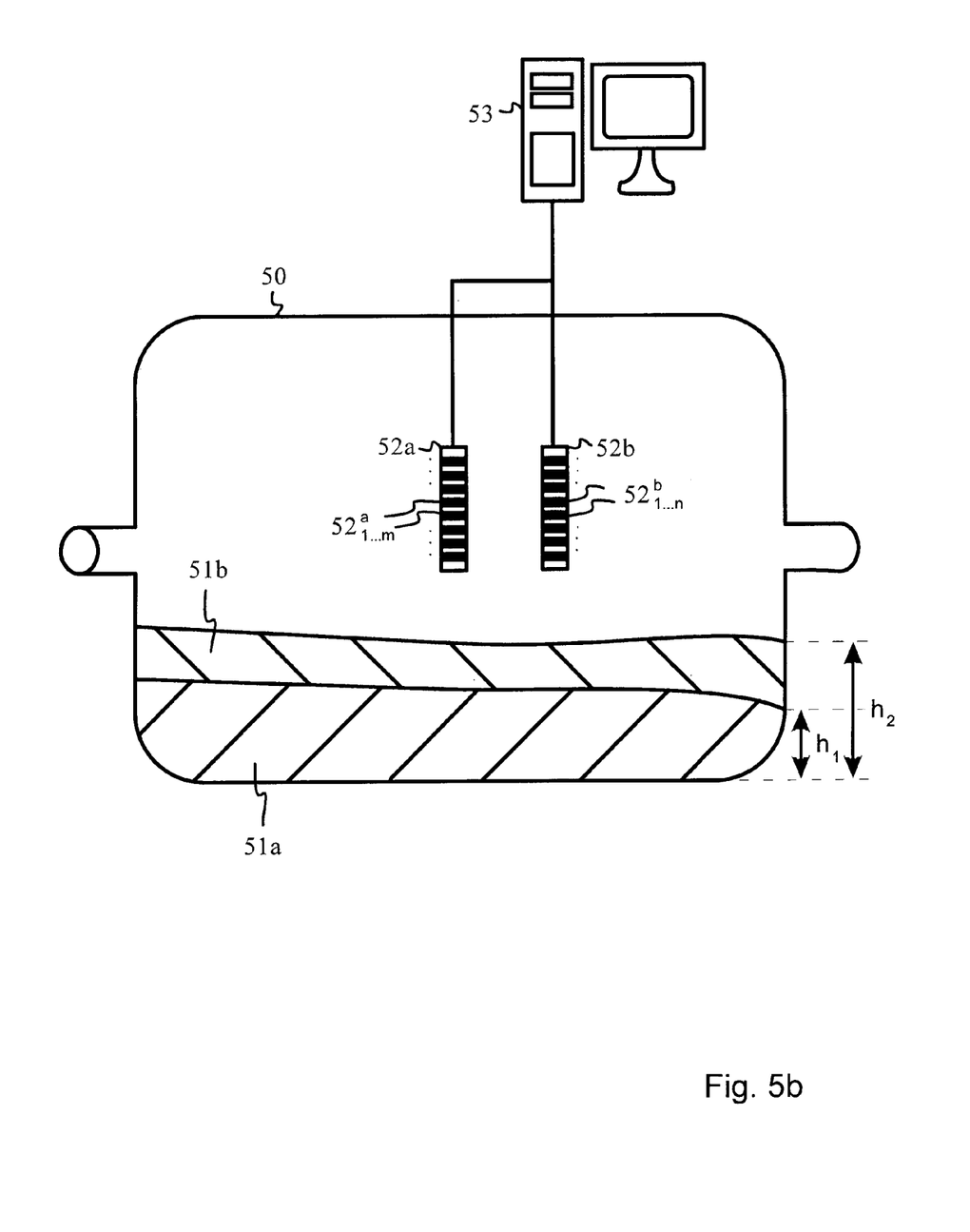
FIG. 5b presents an application similar to FIG. 5a wherein the measuring instrument comprises two separate bar-shaped probes disposed side by side.

FIG. 5b, in turn, shows an application using a different set of probes. In other respects, the measurement arrangement is identical to FIG. 5a. Instead of a single probe, two probes 52a and 52b can be used side by side. The first probe 52a comprises electrodes $52^a_1, 52^a_2, \ldots, 52^a_8$ and the second probe respectively electrodes $52^b_1, 52^b_2, \ldots, 52^b_8$. The numbers of the electrodes are indicated in the figure by indices m and n, and it is possible to use numbers wherein m≠n. The container 50 still acts as a passage volume for a mixture formed by liquids and solid materials, whereupon materials of different masses can be sedimented on the bottom of the container in their proper layers 51a, 51b. The task is therefore to find out $h_1$ and $h_2$ as above, either as pure boundary distance information from a desired reference, or as more extensive three-dimensional boundary data which can be drawn as a three-dimensional representation of the content of the desired volume. As stated in connection with the previous figure, to produce a three-dimensional representation requires a set of electrodes wherein the vectors between the electrodes span a three-dimensional (sub)space. For example, two probes both comprising two electrodes can together span a three-dimensional subspace if the probes are not disposed in parallel to each other. The process is controlled by a computer 53 connected to both probes 52a-b. The computer can be a local controller disposed in connection to the apparatus, or for example a separate server disposed over a data link. The current feed and measurement parts can, if necessary, be located in a physically different unit than the processor or computer performing the calculation, as described in connection with FIG. 5a.

Two or more separate probes may be located at a desired distance to each other, and their positions, mutual locations or the rotational angles of a probe relative to the other probes or the container can be varied. In a preferred embodiment there are typically 3 . . . 16 electrodes.

The idea of the present invention can be applied to volumes that contain many kinds of liquids, solid materials, emulsions and mixtures, which may be vessels, containers, pipeworks, caves or similar places wherein mixing or sedimentation of materials is possible and wherein the electrical properties of different materials (for example electrical conductivities or capacitive properties of materials) are different. Furthermore, the invention can be applied for example in ground measurement (geological surveys). Typical exemplary embodiments include different flow and sedimentation applications where separation or segregation of materials takes place or where it is necessary to detect volumes, surface levels or the presence of a desired material in a specific industrial process.

The invention is not limited merely to the exemplifying embodiments referred to above; instead, many variations are possible within the scope of the inventive idea defined by the claims.

The invention claimed is:

1. A method for detecting the locations of a material boundary or boundaries included in a volume within a container, the volume comprising at least one material, wherein at least part of the volume is liquid material and at the bottom of the container the volume comprises a sedimented layer of materials, and wherein a set of probes further comprising at least one probe is used, the method comprising the steps of:
   introducing a set of probes comprising at least one pair of electrodes in a volume under examination;
   feeding current or voltage via at least one pair of electrodes, and measuring current or voltage from at least one pair of electrodes; and
   using a measurement geometry representing the arrangement in the calculation, and selecting a calculation algorithm needed in the calculation;
   wherein the method further comprises the steps of:
   disposing at least three electrodes of the set of probes in the volume under examination in an assembly arranged not in a straight line relative to each other, all electrodes of the set of probes being located only in the volume of the liquid material and entirely above the sedimented layer of material;
   calculating the electrical conductivity distribution in the volume under examination on the basis of the measurement results; and
   concluding, on the basis of the electrical conductivity distribution and electrode location information, the location of at least one material boundary in the volume under examination.

2. The method according to claim 1, wherein the method further comprises the step of:
   carrying out the feeding and measuring step using electric impedance tomography (EIT) or electric resistivity tomography (ERT).

3. The method according to claim 2, wherein the method further comprises the step of:
   disposing the electrodes on at least one probe of the set of probes such that the vectors between electrodes span a three-dimensional subspace.

4. The method according to claim 2, wherein the method further comprises the step of:
   disposing the electrodes on at least two separate probes, the electrodes on each probe being disposed on a straight line.

5. The method according to claim 2, wherein the method further comprises the step of:
   using an inverse problem 1D-σ-method in the calculation to solve the planar profiles of the boundaries.

6. The method according to claim 2, wherein the method further comprises the step of:
   determining a function of the measured voltage or current values for selected numerical values representing the boundary by methods of machine learning.

7. The method according to claim 6, wherein the method further comprises the step of:
   using the results obtained from simulation as training material in the methods of machine learning.

8. The method according to claim 6, wherein the employed method of machine learning is MLP-network (Multi-Layer Perceptron).

9. The method according to claim 8, wherein the MLP-network is trained by using the Levenberg-Marquardt algorithm.

10. The method according to claim 2, wherein the method further comprises the step of:
    monitoring the fouling of the electrodes by estimating the contact impedances between each electrode and the surrounding material.

11. A system for detecting the locations of a material boundary or boundaries included in a volume within a container, the volume comprising at least one material, wherein at least part of the volume is liquid material, and at the bottom of the container the volume comprises a sedimented layer of material, and wherein a set of probes further comprising at least one probe is used, the system comprising:
    a set of probes comprising at least one pair of electrodes disposed in a volume under examination;
    feeding means for feeding current or voltage via at least one pair of electrodes, and measuring means for measuring voltage or current from at least one pair of electrodes; and
    a processor using a measurement geometry representing the arrangement in the calculation and a selected calculation algorithm needed in the calculation;
    wherein the system further comprises:
    at least three electrodes of the set of probes disposed in the volume under examination in an assembly arranged not in a straight line relative to each other, all electrodes of the set of probes being located only in the volume of the liquid material and entirely above the sedimented layer of material;
    said processor for calculating the electrical conductivity distribution in the volume under examination on the basis of the measurement results; and
    said processor for concluding the location of at least one possible material boundary in the volume under examination on the basis of the electrical conductivity distribution and electrode location information.

12. The system according to claim 11, wherein the system further comprises:
    current feeding and measuring means arranged to carry out the feeding and measuring steps using electric impedance tomography (EIT) or electric resistivity tomography (ERT).

13. The system according to claim 12, wherein the system further comprises:
    electrodes disposed on at least one probe of the set of probes such that the vectors between electrodes span a three-dimensional subspace.

14. The system according to claim 12, wherein the system further comprises:
    electrodes disposed on at least two separate probes the electrodes on each probe being disposed on a straight line.

15. The system according to claim 12, wherein the system further comprises:
said processor arranged to use an a standard inverse problem 1D-σ-method in the calculation to solve the planar profiles of the boundaries.

16. The system according to claim 12, wherein the system further comprises:
said processor arranged to determine a function of the measured voltage or current values for selected numerical values representing the boundary by methods of machine learning.

17. The system according to claim 16, wherein the system further comprises:
said processor arranged to use the results obtained from simulation as training material in the methods of machine learning.

18. The system according to claim 16, wherein the employed method of machine learning is MLP-network (Multi-Layer Perceptron).

19. The system according to claim 18, wherein the MLP-network is trained by using the Levenberg-Marquardt algorithm.

20. The system according to claim 12, wherein the system further comprises:
said measuring means for monitoring the fouling of the electrodes by estimating the contact impedances between each electrode and the surrounding material.

21. A computer having installed thereon a computer program for detecting the locations of a material boundary or boundaries included in a volume within a container, the volume comprising at least one material, wherein at least part of the volume is liquid material, and at the bottom of the container the volume comprises a sedimented layer of material, wherein a set of probes further comprising at least one probe is used, and wherein the set of probes comprising at least one pair of electrodes is disposed in a volume under examination, the computer program comprising program code which, when run on a data processing device, is arranged to control the following steps:

feeding current or voltage via at least one pair of electrodes, and measuring current or voltage from at least one pair of electrodes; and using a measurement geometry representing the arrangement in the calculation, and selecting a calculation algorithm needed in the calculation;

wherein at least three electrodes of the set of probes are disposed in the volume under examination in an assembly arranged not in a straight line relative to each other, all electrodes of the set of probes being located only in the volume of the liquid material and entirely above the sedimented layer of material; and wherein the computer program is further arranged to control the following steps:

calculating the electrical conductivity distribution in the volume under examination on the basis of the measurement results; and concluding, on the basis of the electrical conductivity distribution and electrode location information, the location of at least one material boundary in the volume under examination.

* * * * *

UNITED STATES PATENT AND TRADEMARK OFFICE
CERTIFICATE OF CORRECTION

PATENT NO.         : 9,182,264 B2                                Page 1 of 1
APPLICATION NO.    : 13/581199
DATED              : November 10, 2015
INVENTOR(S)        : Kaipio et al.

It is certified that error appears in the above-identified patent and that said Letters Patent is hereby corrected as shown below:

In The Claims

At column 17, line 3:

delete "a standard" after "an"

Signed and Sealed this
Twelfth Day of April, 2016

Michelle K. Lee
*Director of the United States Patent and Trademark Office*